Nov. 28, 1950 A. G. FOX 2,531,419

HYBRID BRANCHING CIRCUITS

Filed Dec. 5, 1947

INVENTOR
A. G. FOX
BY H. O. Wright
ATTORNEY

Patented Nov. 28, 1950 2,531,419

UNITED STATES PATENT OFFICE 2,531,419

HYBRID BRANCHING CIRCUITS

Arthur Gardner Fox, Eatontown, N. J., assignor to Bell Telephone Laboratories, Incorporated, New York, N. Y., a corporation of New York Application December 5, 1947, Serial No. 789,812

5 Claims. (Cl. 178—44)

This invention relates to signal separating circuits employing one or more hybrid structures. More particularly, it relates to signal separating circuits in which none of the input signals are reflected back to the source of said signals.

An object of the invention is to provide circuits which will direct particular signals into particular output circuits and exclude other signals from the various output circuits.

Another object is to provide signal separating circuits in which the reflection of energy to the source thereof is substantially eliminated.

Other and further objects will become apparent during the course of the following description of the principles of the invention and of particular illustrative embodiments of those principles, as well as from the appended claims.

The signal separating circuits of the invention, preferably, employ pairs of hybrid structures joined by two identical delay branches. The total electrical length between the hybrid structures of each pair is the same for both delay branches. Alternatively, one delay branch can exceed the electrical length of the other by one or more full cycles (i. e. 360 degrees or multiples thereof) without changing the results obtained, as will be discussed in greater detail below. However, in the first-mentioned case, the distances along said two delay branches from either hybrid structure to identical reflecting structures located along each of the delay branches differ by one-quarter wavelength.

As a result of this, electromagnetic waves reflected by the reflecting structures arrive back at the hybrid structure 180 degrees out of phase with respect to their phase relation when first introduced through the hybrid structure into the two delay branches. In other words, their relative phase relation has been reversed. The reflected wave power will consequently be directed, by the hybrid structure, into the hybrid terminal which is conjugately related to the terminal of the hybrid structure through which they were first introduced into the circuit.

Two somewhat different, but analogous, uses of the principles involved will be discussed in detail below.

Other specifically different circuits of this general character are disclosed and claimed in the copending application of W. D. Lewis Serial No.

789,985, filed December 5, 1947 and assigned to applicant's assignee.

Figure 1:
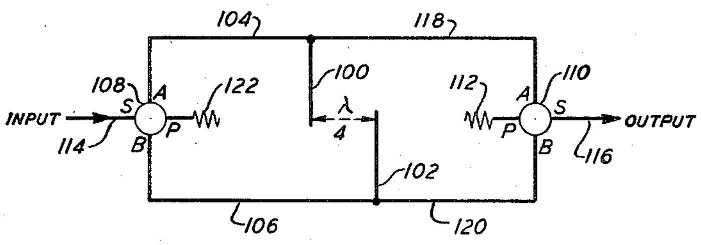
Figure 2:
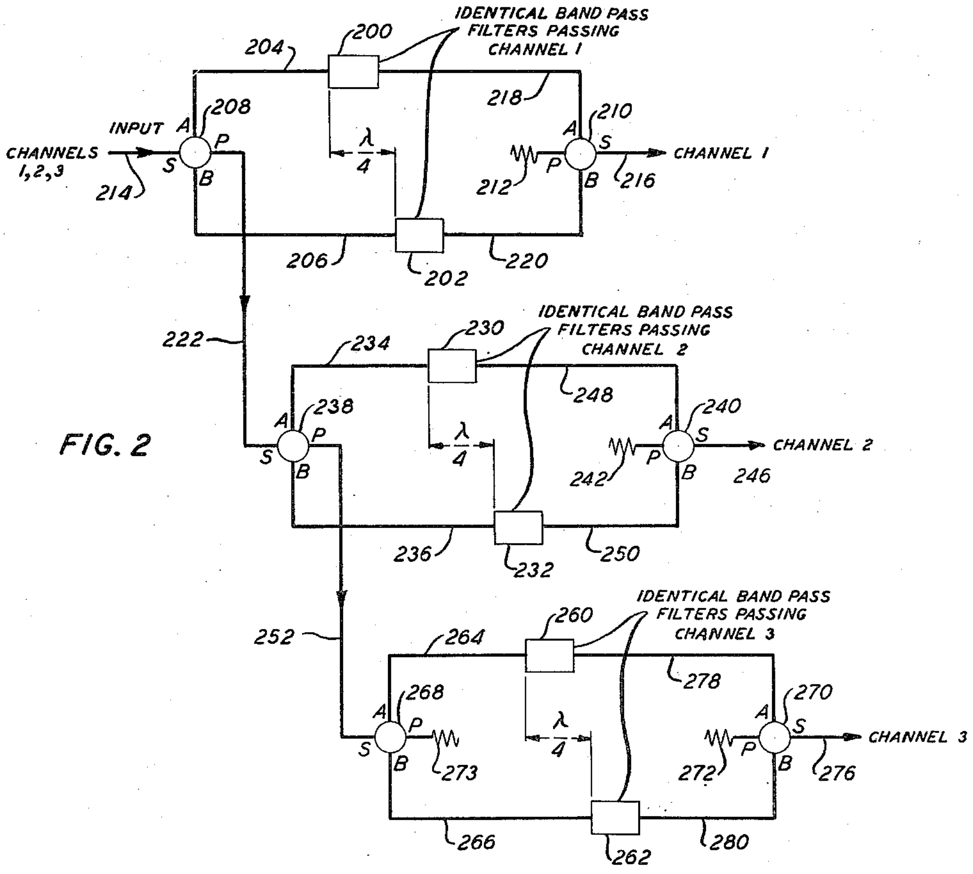

The principles of the invention will be more readily understood in connection with the following detailed description of illustrative circuits and from the appended drawing, in which:

Fig. 1 shows, in schematic diagram form, a circuit of the invention in which reflections are combined with an original incoming signal to reshape said signal; and Fig. 2 shows, in schematic diagram form, a circuit of the invention in which the several channels, or bands of frequencies, in a multichannel communication system can be branched off from each other.

In more detail, in Fig. 1, hybrid structures 108 and 110 are connected by delay branches, comprising lengths of transmission line 104 together with 118, and 106 together with 120, respectively. The combined length of the first-mentioned two lines is equal to the combined length of the second-mentioned two lines, all four lines being of identical construction and being adapted to freely transmit the entire range of frequencies to be employed by the system. By way of example, if frequencies in the microwave range (1,000 megacycles and above) are to be employed, lines 104, 118, 106 and 120 are preferably wave guides and may be round or rectangular in cross-section. They should be of sufficiently large cross-sectional dimensions to freely transmit the entire frequency region employed by the system. At somewhat lower frequencies coaxial conductor transmission lines can be employed to advantage. At frequencies under 500 kilocycles paired conductor transmission lines could be employed, but at such low frequencies lumped element structures will usually be found more practicable than transmission line structures for obtaining the required phase shifts.

The generic characteristics of hybrid structures are discussed in detail in the above-mentioned application of W. D. Lewis, from which it is apparent that electromagnetic wave power introduced into the S terminal (line 114) will divide equally in the A and B terminals, lines 104, 106, no energy reaching the P terminal (connected to resistive load 122) because the P terminal is conjugately related to terminal S. Terminals A and B are also conjugately related to each other.

Structures 100 and 102 are reflecting devices providing, preferably, a series of reflections delayed by different time intervals, the over-all purpose of the entire circuit of Fig. 1 being to reshape the input signal by adding to the input signal a number of reflections thereof, delayed by different intervals of time.

The primary purpose of the over-all circuit is advanced in the circuits of the present invention, in that reflections seeking to return to the input or source of signal are diverted and can be eliminated by dissipation in a resistive termination so that disturbing secondary reflections which would tend to arrive back at the output terminals with more delay than is required, will not be encountered with the arrangements of the invention.

One form of the general reshaping process involved is described in detail by M. Levy in an article entitled "The Impulse Response of Electrical Networks" published in the Journal of the Institute of Electrical Engineers, vol. 90, Part III, No. 12, for December 1943 and reprinted therefrom in "Electrical Communication," vol. 22, No. 1, for 1944, published by the International Telephone and Telegraph Corporation of 67 Broad Street, New York 4, New York.

Structures 100 and 102 are substantially identical and are preferably of the artificial line (sometimes called retardation line) type and of sufficient complexity to provide the number and time distribution of reflections required to effect the degree of reshaping of the input signal sought. Alternatively, structures 100 and 102 can provide only one, or a few, echoes, and additional echoes can be added by successive structures of the type shown in Fig. 1, the output of one structure being connected to the input of the next successive structure, each structure having reflecting devices similar to 100 and 102 but contributing echoes of different time delays until the total effect desired is realized.

At relatively low frequencies these structures can be of the general type shown in the above-mentioned article by Levy; at somewhat higher frequencies they can be coaxial conductor structures of the general type illustrated in the United States Patent 2,183,123 issued December 12, 1939 to W. P. Mason, adapted to simulate long delay lines in accordance with principles well known to those skilled in the art; while at very high frequencies or microwave frequencies they can be adaptations of the wave guide structures of the general type disclosed in my copending application entitled "Wave Transmission Networks," Serial No. 452,851, filed July 30, 1942, now Patent No. 2,432,093, issued December 9, 1947.

For microwaves (above 1,000 megacycles) the hybrid structures 108 and 110 can conveniently be of the "hybrid junction" (wave guide double-T junction) or of the "hybrid ring" (wave guide or coaxial ring hybrid structure) types, numerous forms of which are illustrated and described in detail in the copending application of W. A. Tyr-
detail in the copending application of W. A. Tyr-
rell, Serial No. 470,810, filed December 31, 1942. Alternatively the improved type shown and described in the copending application of H. T. Friis, W. D. Lewis and L. C. Tillotson, Serial No. 789,850, filed December 5, 1947, can be used.

Between 10 megacycles and 2,000 megacycles coaxial hybrid ring structures can conveniently be used and below 10 kilocycles "hybrid" coils or other lumped circuit equivalents, designed for use over the specific range of frequencies to be employed, can conveniently be used.

The operation of the circuit of Fig. 1, at whatever frequency range it is designed to function, is as follows.

The input signal is introduced through transmission line 114 to the "S" terminal of hybrid structure 108. The power of the input electromagnetic wave divides equally between transmission lines 104 and 106. These half-power waves arrive at the identical reflecting devices 100 and 102, where a portion of the half-power wave enters the reflecting device and a portion proceeds directly past and through transmission lines 118 and 120, respectively, to terminals A and B of hybrid structure 110. Since these wave components have traveled the same total distance, they still have the same phase relation as upon leaving hybrid 108. They therefore are transmitted wholly into the S terminal of hybrid 110, and none of the power is delivered to the P terminal 112. Meanwhile the portions of these half-power voltage waves which enter reflecting devices 100 and 102 are reflected at one or more points within the structures to produce one or a plurality of reflections delayed by predetermined time intervals. These reflections travel both ways upon emerging again from devices 100 and 102, i. e., reflections from device 100 divide between transmission lines 104 and 118 and reflections from device 102 divide between transmission lines 106 and 120.

Since line 106 is one-quarter wavelength longer than line 104 the reflections arriving back at terminals A and B of hybrid structure 108 will be 180 degrees out of phase with respect to their original phase relation because those arriving over line 106 have twice traversed a path one-quarter wavelength longer than those arriving over line 104. Consequently, by virtue of the characteristics of the hybrid structure, they will combine in terminal P of the hybrid structure 108 (since P is the conjugate of terminal S) and may conveniently be dissipated in resistive terminating impedance 122.

Impedance 122 should be proportioned to substantially match the impedance looking into hybrid terminal P when the other three terminals S, A and B of the hybrid structure are likewise terminated by their respective impedances. This preserves the balance of the hybrid structure and avoids irregularities in performance which may result if too great a mismatch is encountered between any hybrid terminal and the impedance of the structure to which that terminal is connected.

At microwave frequencies terminating impedance 122 can be, conventionally, a short section of wave guide enclosing a quantity of resistive material, usually in the form of carbon particles affixed to a member of dielectric material, the outer end of the section of wave guide being closed. At somewhat lower frequencies 122 can be a section of coaxial line with compressed carbon particles in the form of toroids bridging the space between the center and outside conductors. As in the case of the wave guide device, the free end of the coaxial line section should be closed. At frequencies below several megacyles, 122 can be of any of the many conventional types of resistors well known to those skilled in the art.

The portions of the input signal which reach hybrid structure 110 will have the same relative phase with which they left hybrid 108 since they have traversed paths having the same total phase shift and consequently will combine at terminal S of hybrid 108 and the combined signal power will appear on transmission line 116, with none appearing at termination 112. Likewise the portions of the reflections from reflecting devices 100 and 102 respectively, which travel toward hybrid structure 110, will arrive at said structure substantially in the same relative phase with which they left hybrid structure 108, and will likewise combine in terminal S of the hybrid structure. They will therefore combine in line 116 with the combined portions of the input signal in that line and the desired reshaping of the input signal will therefore be effected in line 116.

The second hybrid 110 of Fig. 1 is employed chiefly to preserve the symmetry of the circuit. If signals are always to be introduced through hybrid 108, hybrid 110 can be omitted and lines 118 and 120 can then be joined directly to line 116.

In circuits of the type shown in Fig. 1, in which wave guide transmission lines are used and hybrid 110 is to be omitted, a wave guide junction of the type described and claimed in the above-mentioned application of H. T. Friis et al., can be used to join lines 118, 120 and 116.

As described in detail above, all reflections traveling back to hybrid structure 108 will combine in terminal P of that structure and be dissipated in terminating impedance 122. Therefore, no reflections will appear in the input line 114 and no rereflections from the input line will be encountered.

It will be understood that although the above discussion in connection with Fig. 1 was in terms of reflections delayed with respect to the main signal in order to produce modifications of the transient response, the amplitude versus frequency response of the device is also affected by the structures 100 and 102 so that we may alternatively think of the circuit of Fig. 1 as a method of obtaining frequency selectivity without incurring reflections in the input and output lines.

In Fig. 2 a circuit arrangement is shown for segregating, or branching off, the individual channels or frequency bands of a multichannel communication system. Structures of the type shown in Fig. 2 are known as "hybrid branching filters." Specifically different structures for solving the problem by the use of hybrid branching filters are disclosed in the copending application of W. D. Lewis mentioned above. The essential difference between the structures of Figs. 2 and 3 of the Lewis application and Fig. 2 of this application is that band-pass filters are employed in the two arms of the hybrid branching filters of this application, while Lewis employs band reflection filters, with the result that in the structures of the Lewis application the channel to be segregated is reflected back to the input hybrid structure and appears at the P terminal of that structure.

The operation of the hybrid branching filters of Fig. 2 is as follows.

The electromagnetic wave power of all the channels of a multichannel communication system (three channels, or frequency bands, are assumed for purposes of illustration) is introduced by transmission line 214 into the S terminal of hybrid structure 208.

The electromagnetic wave power, thus introduced, divides equally between terminals A and B and passes over lines 204 and 206 to identical band-pass filters 200 and 202, line 206 being one-quarter wavelength longer than line 204 at the median frequency of the frequency range of the channels which are to be reflected.

By way of illustration, the channels 1, 2 and 3 can be the lower three of the five channels of the illustrative system described in the Lewis application, namely, three channels each 20 megacycles wide and having mid-band frequencies of 3870, 3950 and 4030, respectively.

Filters 200 and 202 will then, by way of example, pass the band or channel of frequencies from 3860 to 3880 megacycles inclusive and reflect the other two channels (2 and 3) back to hybrid structure 208.

The two half-power portions of the waves, falling within channel No. 1, will accordingly pass through filters 200 and 202 and proceed through lines 218 and 220 respectively, to terminals A and B respectively, of hybrid structure 210. From the characteristics of hybrid structures, as described in detail in the Lewis application, the half-power portions of channel 1 will combine in the S terminal of hybrid structure 210 and appear in line 216 connecting to this terminal.

The half-power waves falling within channels 2 and 3 will, as stated above, be reflected back to hybrid structure 208 and since the waves in transmission line 206 have twice traversed an extra one-quarter wavelength of line they will have been changed by 180 degrees in relative phase with respect to the waves being reflected back through line 204. Consequently the waves reflected back in lines 204 and 206 (channels 2 and 3) will combine in the P terminal of hybrid structure 208 and proceed over transmission line 222 to a second hybrid branching filter comprising hybrid structures 238 and 240 and their associated circuits.

This second hybrid branching circuit is substantially identical with the one just described above, except that filters 230 and 232 pass channel 2, (3940 to 3960 megacycles, inclusive) electromagnetic wave power of this channel being passed on through hybrid structure 240 to line 246 and electromagnetic wave power of channel 3 being reflected back to hybrid structure 238 and combining in line 252 to proceed to a third hybrid branching filter comprising hybrid structures 268 and 270 and associated circuits.

In the second hybrid branching filter, lines 236 and 248 can conveniently be of identical length and are one-quarter wavelength longer than lines 234 and 250, which can also conveniently be identical in length, all four lines being preferably of identical construction. As explained in the above-mentioned application of W. D. Lewis additional phase differences of a complete cycle (i. e. 360 degrees, or any multiple thereof) can be inserted, if desired, in any of these lines without affecting the operation of the branching filter circuit. As is also mentioned in the Lewis application, a half cycle (i. e. 180 degrees) or any odd multiple thereof, can be inserted in any of these lines and will have the effect of interchanging the terminals of the second hybrid in which various component powers will combine. Merely interchanging the terminals, to which the pair of transmission paths joining the hybrids are connected, at either one of the hybrids will have the same effect as introducing an additional 180-degree phase shift in one of these paths. Hybrid structures 238 and 240 are of the same construction as hybrid structures 208 and 210 of the first branching filter.

The third channel as mentioned above passes on to the third branching filter which is identical with the first and second branching filters except that band-pass filters 260 and 262 pass the third channel of frequencies between 4020 and 4040 megacycles, respectively.

Again, for the third hybrid branching filter, lines 278 and 266 can conveniently be of identical length and are one-quarter wavelength longer than lines 264 and 280 which can also conveniently be identical in length, all four lines being preferably of identical construction. Hybrid structures 268 and 270 are of the same construction as hybrid structures 208 and 210 of the first branching filter.

Terminations 212, 242, 272 and 273 are dissipative terminations matching the impedance of the respective hybrid structure terminals to which they are connected.

The third branching filter could be omitted and the third channel taken directly from transmission line 252 in some cases. In others, however, the use of a third branching filter will be found to be preferable as "interchannel noise", i. e. noise of frequencies lying between the channels 1, 2 and 3 of the system, and some crosstalk from the other channels of the system resulting from imperfect impedance balances throughout the system may be present in transmission line 252.

The specific form of hybrid branching filter, described above, as distinguished from the specific form of the Lewis application using band reflection filters, offers the advantage of the increased frequency discrimination afforded by the channel filters 200, 202, etc., in addition to the discrimination of the hybrid structures.

It is obvious that any desired number of branching filters can be connected in parallel in the manner shown in Fig. 2 of the present application, to accommodate as many appropriately spaced frequency bands as it may be necessary to separate, three having been chosen merely for purposes of illustration. It is also obvious that the several channels can be segregated in any order desired, for example, channel 3 could first be segregated, then channel 1 and finally channel 2, or any other order could be followed, as special circumstances might require. It is, further, apparent that the principles of the invention can readily be applied to systems employing compressional wave energy. One form of acoustic bridge or hybrid circuit is disclosed, for example, in the copending application of K. S. Johnson, Serial No. 688,906, filed August 7, 1946, now Patent No. 2,516,776, issued July 25, 1950, and assigned to applicant's assignee. Acoustical systems embodying the principles of the invention can, for example, be employed to branch off, or segregate, various frequency regions of a very broad frequency range so that each region of the broad range can be directed to the most suitable type of loudspeaker or horn for that region, a higher quality of speech and musical reproduction being the ultimate aim.

Numerous other arrangements and modifications of the systems disclosed, as well as other applications of the principles of the invention, will readily occur to those skilled in the art within the spirit and scope of the invention.

The scope of the invention is defined in the following claims.

What is claimed is:

1. A hybrid branching circuit for segregating, or branching off, predetermined electromagnetic wave power components from other electromagnetic wave power components, comprising an input hybrid structure and an output hybrid structure, two substantially identical transmission paths interconnecting two conjugate terminals of said first hybrid structure to two conjugate terminals of said second hybrid structure, respectively, two identical reflecting structures cooperatively connected to and associated with said transmission paths, respectively, the reflecting structure of one path being electrically located one-quarter wavelength nearer said first hybrid structure than the reflecting structure of said other path, said reflecting structures passing the electromagnetic wave power components, to be branched, to said second hybrid structure and reflecting all other electromagnetic wave power components back to said first hybrid structure.

2. In a system for reshaping an input signal by adding to said signal one or more delayed reflections of said signal, a first hybrid structure and a second hybrid structure, each of said structures having two pairs of conjugately related terminals, two substantially identical transmission paths for said signal interconnecting two conjugate terminals of said first hybrid structure to two conjugate terminals of said second hybrid structure, respectively, two identical reflecting structures cooperatively connected to and associated with said transmission paths, respectively, the reflecting structure of one path being located one-quarter wavelength nearer said first hybrid structure than the reflecting structure of said other path, said transmission paths and reflecting structures passing said signal and reflections thereof to said second hybrid structure without change in the relative phases of said signal and of said reflections thereof, respectively, but transmitting reflections returning to said first hybrid with a reversal of the relative phases of said reflections in said two paths whereby they appear in the terminal of said first hybrid structure which is conjugately related to the input terminal of said structure and can be dissipated in a termination connecting to said conjugately related terminal.

3. In a system for branching off one channel, or frequency band, of a multichannel, or multifrequency band, communication system, the combination which comprises an input hybrid structure and an output hybrid structure, a pair of transmission paths having substantially identical end-to-end phase shifts, said transmission paths connecting a conjugate pair of terminals of one hybrid structure with a pair of conjugate terminals of said other hybrid structure, respectively, said paths including identical band-pass filters passing one channel, or frequency band, of said system, the filter in one of said paths being one-quarter wavelength nearer the input hybrid structure than the filter in the other of said paths.

4. A plurality of circuits each arranged as defined in claim 3, the band-pass filter for each circuit transmitting a different one of the channels, or frequency bands, of said communication system, the plurality of circuits being associated and connected together so that the channels or bands rejected by one circuit will be transmitted to the input hybrid of the next successive circuit.

5. A hybrid branching circuit for segregating, or branching off, predetermined wave power components, from other wave power components, comprising an input hybrid structure and an output hybrid structure, two substantially identical transmission paths interconnecting two conjugate terminals of said first hybrid structure to two conjugate terminals of said second hybrid structure, respectively, two substantially identical reflecting structures cooperatively connected to and associated with said transmission paths, respectively, the reflecting structure of one path being located one-quarter wavelength nearer said first hybrid structure than the reflecting structure of said other path, said reflecting structures passing the wave power components to be branched off, to said second hybrid structure and reflecting all other wave power components back to said first hybrid structure.

ARTHUR GARDNER FOX.

REFERENCES CITED

The following references are of record in the file of this patent:

UNITED STATES PATENTS

| Number | Name | Date |
|---|---|---|
| 1,924,303 | Boddie | Aug. 29, 1933 |
| 2,039,202 | Vos | Apr. 28, 1936 |
| 2,248,250 | Peterson | July 8, 1941 |